US008322146B2

(12) United States Patent
Rizkalla et al.

(10) Patent No.: US 8,322,146 B2
(45) **Date of Patent: *Dec. 4, 2012**

(54) TRANSITION DUCT ASSEMBLY

(75) Inventors: Hany Rizkalla, Stuart, FL (US); Stephen W. Jorgensen, Palm City, FL (US); Peter Stuttaford, Jupiter, FL (US); Plazi Ricklin, Altadena, CA (US); David John Henriquez, Hobe Sound, FL (US)

(73) Assignee: Alstom Technology Ltd, Baden (CH)

( * ) Notice: Subject to any disclaimer, the term of this patent is extended or adjusted under 35 U.S.C. 154(b) by 886 days.

This patent is subject to a terminal disclaimer.

(21) Appl. No.: 12/196,629

(22) Filed: Aug. 22, 2008

(65) Prior Publication Data

US 2009/0145137 A1 Jun. 11, 2009

Related U.S. Application Data

(60) Provisional application No. 61/012,636, filed on Dec. 10, 2007.

(51) Int. Cl.
*F02C 7/20* (2006.01)
*F02C 1/00* (2006.01)
*F02G 3/00* (2006.01)

(52) U.S. Cl. ................. 60/796; 60/799; 60/800; 60/752

(58) Field of Classification Search .................... 60/752, 60/796, 799, 800, 39.37; 431/343
See application file for complete search history.

(56) References Cited

U.S. PATENT DOCUMENTS

| | | | | |
|---|---|---|---|---|
| 2,511,432 | A * | 6/1950 | Feilden | 60/796 |
| 2,765,620 | A * | 10/1956 | Egbert | 60/39.37 |
| 3,759,038 | A * | 9/1973 | Scalzo et al. | 60/800 |
| 4,422,288 | A * | 12/1983 | Steber | 60/800 |
| 5,414,999 | A * | 5/1995 | Barnes | 60/722 |
| 5,761,898 | A * | 6/1998 | Barnes et al. | 60/799 |
| 6,619,915 | B1 * | 9/2003 | Jorgensen | 415/138 |
| 6,662,567 | B1 * | 12/2003 | Jorgensen | 60/796 |
| 6,890,148 | B2 * | 5/2005 | Nordlund | 415/115 |
| 6,904,756 | B2 * | 6/2005 | Mack | 60/796 |
| 7,377,117 | B2 * | 5/2008 | Riggi et al. | 60/796 |
| 2009/0188258 | A1 * | 7/2009 | Rizkalla et al. | 60/800 |

* cited by examiner

*Primary Examiner* — William H Rodriguez
*Assistant Examiner* — Carlos A Rivera
(74) *Attorney, Agent, or Firm* — Shook, Hardy & Bacon L.L.P.

(57) ABSTRACT

A transition duct assembly with a thermally free aft frame and mounting system for use in a gas turbine engine are disclosed. The aft frame is capable of adjusting to thermal gradients while the mounting system provides for at least transverse movement of the transition duct during engine assembly. The mounting system also provides a means for raising the natural frequency of the transition duct outside of the engine's dynamic excitation ranges.

15 Claims, 9 Drawing Sheets

TRANSITION DUCT ASSEMBLY

CROSS-REFERENCE TO RELATED APPLICATIONS

This application claims priority to U.S. Provisional Application Ser. No. 61/012,636, filed on Dec. 10, 2007.

TECHNICAL FIELD

The present invention relates to gas turbine engines. More particularly, embodiments of the present invention relate to an apparatus and method for lowering thermal and mechanical stresses in a transition duct assembly while also providing a transition duct assembly with a natural frequencies outside of critical engine frequencies.

BACKGROUND OF THE INVENTION

Gas turbine engines operate to produce mechanical work or thrust. Specifically, land-based gas turbine engines typically have a generator coupled thereto for the purposes of generating electricity. A gas turbine engine comprises at least a compressor section having a series of rotating compressor blades. The compressor receives air from an engine inlet. The air passes through the compressor, which causes the pressure of the air to increase. The compressed air is then directed into one or more combustors where fuel is injected into the compressed air and the mixture is ignited. The hot combustion gases are then directed from the combustion section to a turbine section by a transition duct. Depending on the geometry of the gas turbine engine, often times the combustion section is located radially outward of the inlet to the turbine section, and therefore the transition duct must change in at least a radial profile.

A change in the radial profile can cause numerous assembly issues between the combustor and the turbine. Also, such a change in geometry for the transition duct assembly, which is operating at extremely high temperatures can create high thermal and mechanical stresses in the transition duct assembly.

By nature, the transition duct assembly has a natural operating frequency. Also, the gas turbine engine has a natural frequency, and orders of the natural frequency (i.e. 1E, 2E, 3E, etc). When a component has a natural frequency that coincides with an engine natural frequency or order thereof, the component can become dynamically excited and if care is not taken to avoid the crossings of these frequencies, or minimizing the time for the crossing, the component may experience excessive wear or failure due to the excessive vibrations that occur when operating at the natural frequency or order thereof.

SUMMARY

Embodiments of the present invention are directed towards a system and method for, among other things, improving movement at the aft frame of a transition duct assembly due to thermal gradients. A mounting system is disclosed that provides for at least lateral movement of the aft frame to adjust due to thermal growth while securing the transition duct assembly at both the inlet and outlet in order to raise the natural frequency of the transition duct assembly outside of the gas turbine engine natural frequency or order thereof.

Additional advantages and features of the present invention will be set forth in part in a description which follows, and in part will become apparent to those skilled in the art upon examination of the following, or may be learned from practice of the invention.

BRIEF DESCRIPTION OF THE SEVERAL VIEWS OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different components, combinations of components, steps, or combinations of steps similar to the ones described in this document, in conjunction with other present or future technologies.

Figure 1:
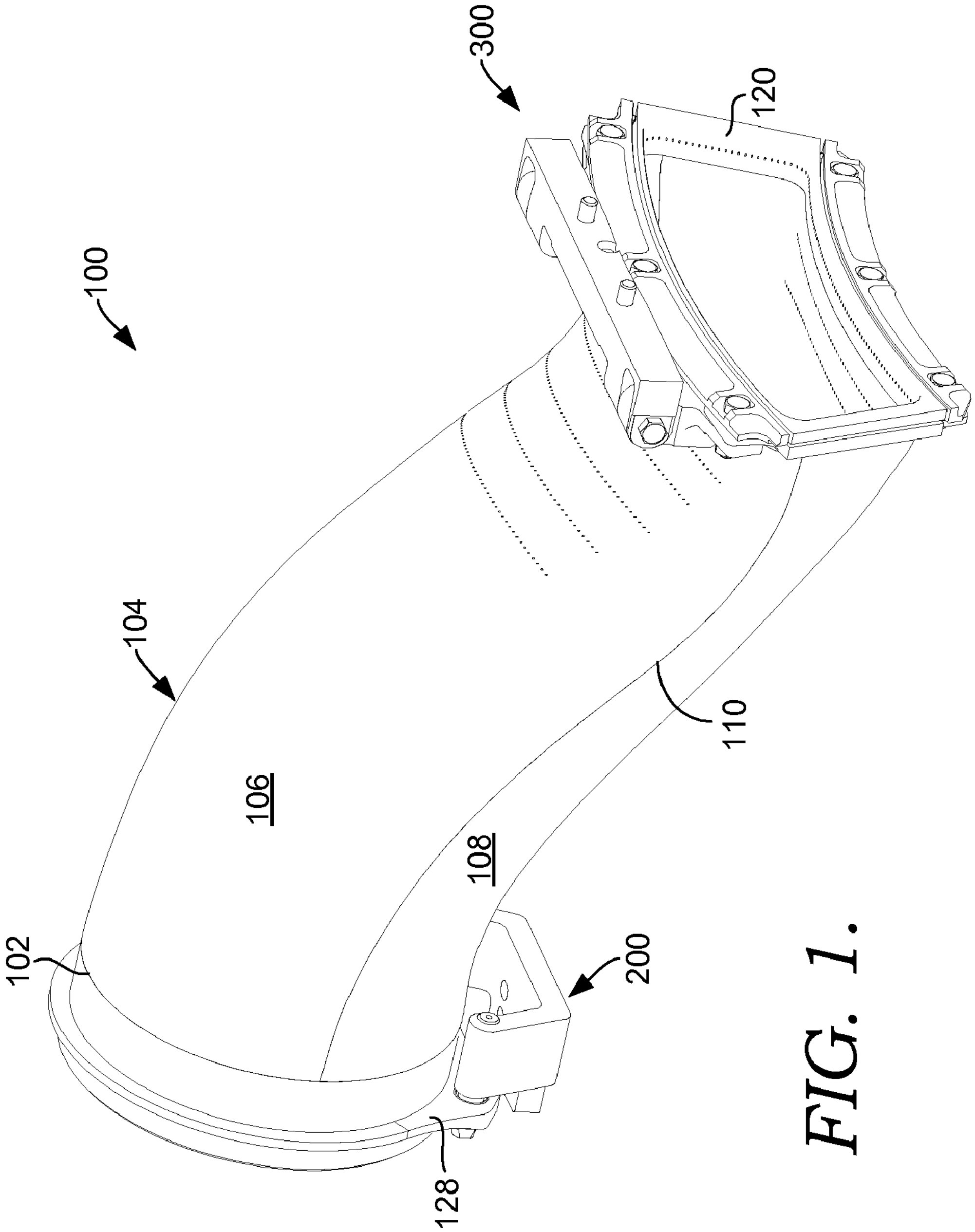
FIG. 1 depicts a perspective view of a transition duct assembly in accordance with an embodiment of the present invention.
Figure 2:
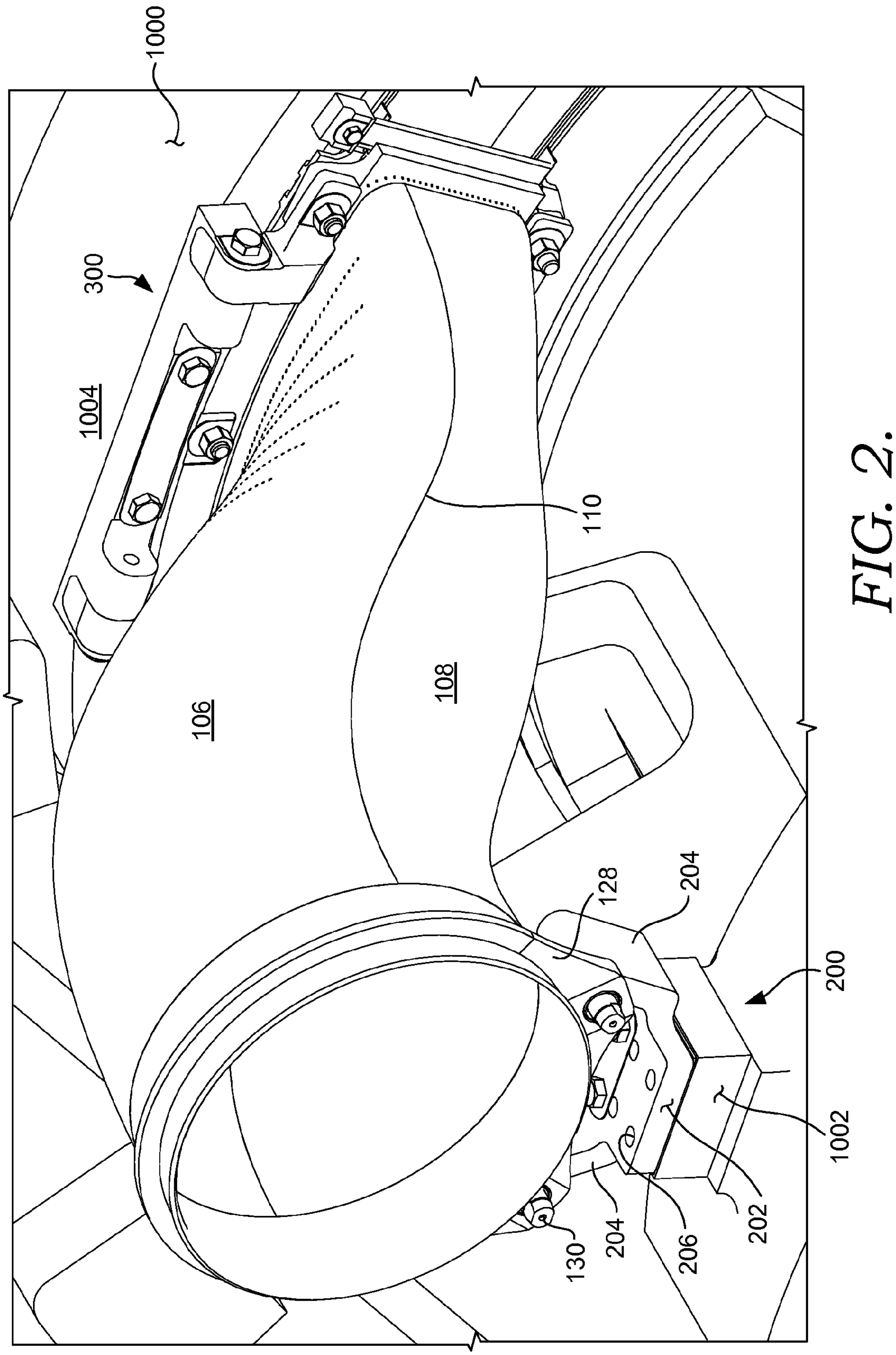
FIG. 2 depicts an alternate perspective view of a transition duct assembly installed in a gas turbine engine in accordance with an embodiment of the present invention.
Figure 3:
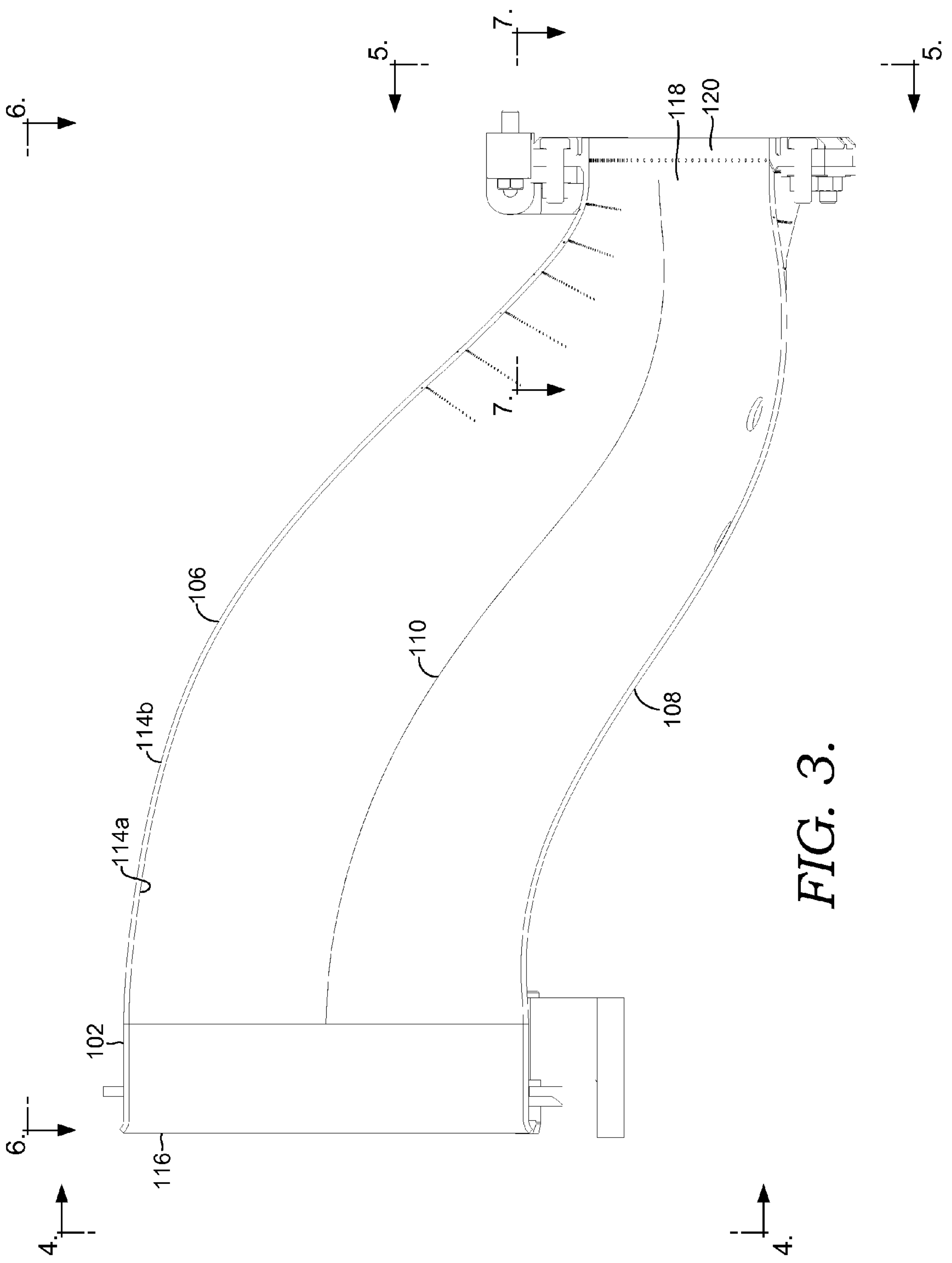
FIG. 3 depicts a cross section view of a transition duct assembly in accordance with an embodiment of the present invention.

Referring initially to FIG. 1, a transition duct assembly 100 in accordance with an embodiment of the present invention is shown. The transition duct assembly 100 includes a generally cylindrical inlet sleeve 102 and a panel assembly 104. The inlet sleeve 102 has an inner diameter and an outer diameter, while the panel assembly 104 extends from the inlet sleeve 102 at the inner and outer diameter thereof via a first panel 106 and a second panel 108, as can be seen with additional reference to FIG. 3. Each of the first panel 106 and second panel 108 is typically formed from a single sheet of metal. The panel assembly 104 is formed by the first panel 106 being fixedly joined to the second panel 108 along a plurality of axial seams 110 by means such as welding (as seen in FIG. 2). Once assembled, the panel assembly 104 forms a duct having an inner wall 114*a*, an outer wall 114*b*, and a first thickness there between as shown in FIG. 3. The panel assembly 104 further contains a generally cylindrical inlet (forward) end

116 (adjoining the inlet sleeve 102) and a generally rectangular exit (aft) end 118, with the exit or outlet end being generally defined by a pair of arcs of different diameters concentric about a center and connected by a pair of radial lines extending from the center. For instance, the arcs of the exit end 118 may be concentric about a center defined by a gas turbine engine 1000 coupled to the exit end 118 of the duct assembly 100. In the construction of the duct assembly 100 described, the inlet sleeve 102 is coupled with an outlet of a combustor (e.g., a can-annular combustor), with the exit end 118 directing the combustion gases to the turbine 1000. The duct also has a generally rectangular aft frame 120 having opposing sidewalls 122 and being fixed to the exit end 118 of the panel assembly 104. The opposing sidewalls 122 are, in one configuration, generally perpendicular to the arcs of the panel assembly exit end 118. Additionally, in one configuration, the aft frame 120 includes a plurality of retention lugs 124 formed on or proximate the arcs of the panel assembly exit end 118. The retention lugs 124 each have a particular thickness and have formed therein a slot 126. Further, the laterally outermost retention lugs 124*a* are generally located proximate ends of the arcs which define the panel assembly exit end 118, and each possess a slot 126*a* having a first circumferential length and a first radial width with the first circumferential length greater than the corresponding first radial width.

It should be understood that the terms "axial", "radial", and "circumferential", as used herein, generally are provided with reference to the turbine 1000 (e.g., a theoretical turbine) connected with the transition duct assembly 100. Accordingly, "axial" generally means with reference to an axis identical to (or parallel with) an axis of the turbine 1000, "radial" generally means along a radius extending from a center rotational axis of the turbine 1000, and "circumferential" generally means along a circumference of a circular frame of the turbine 1000 with which a plurality of transition duct assemblies 100 with exit ends 118 are mounted. Further, the terms "fastener", "bolt", and "pin" are used interchangeably herein to denote a component for mechanically coupling adjacent structures together (e.g., through a threaded interconnection, an interference fit, etc).

Figure 4:
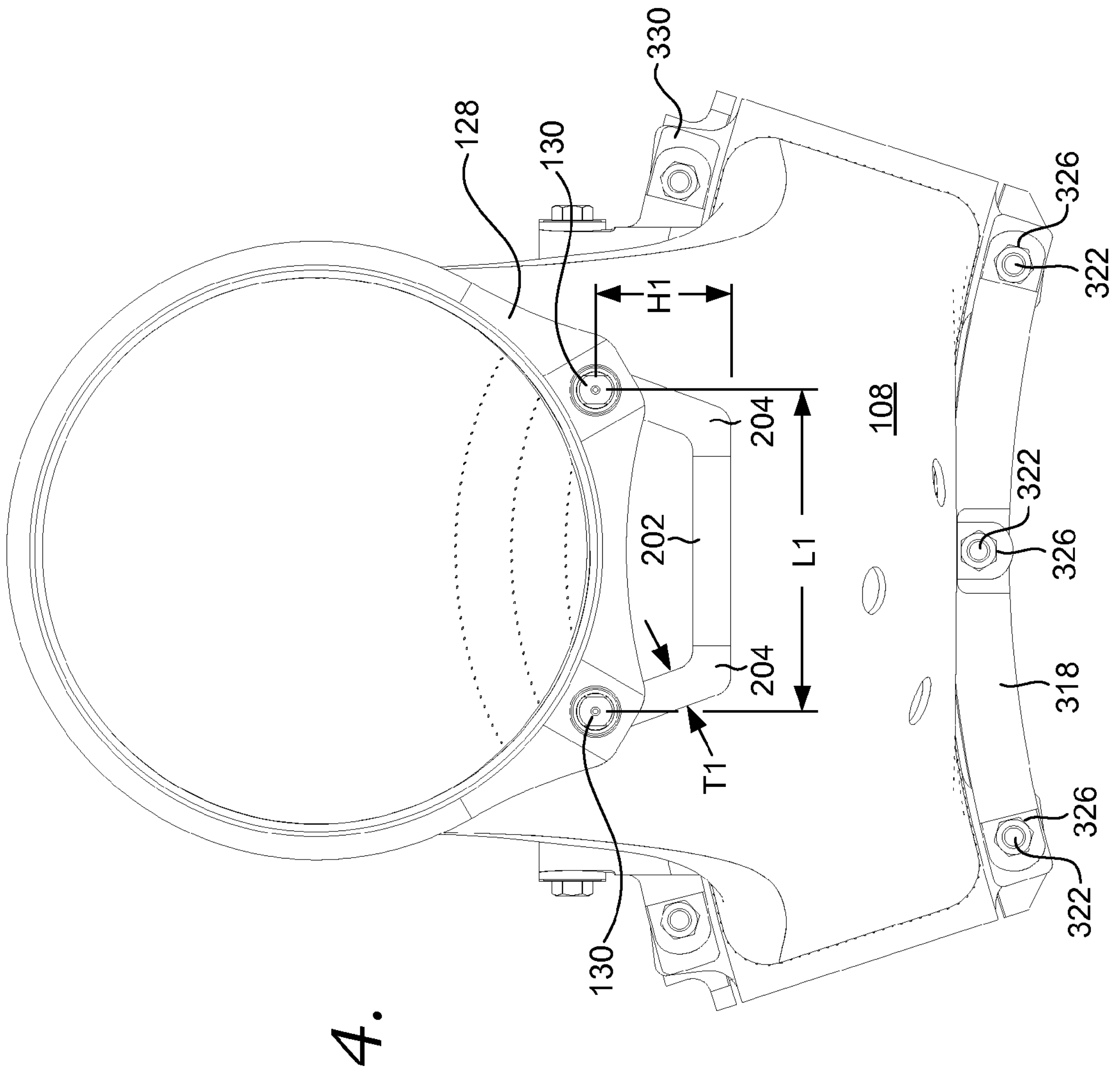
FIG. 4 depicts an elevation view of the transition duct assembly of FIG. 3 looking aft from an inlet of the transition duct assembly in accordance with an embodiment of the present invention.
Figure 5:
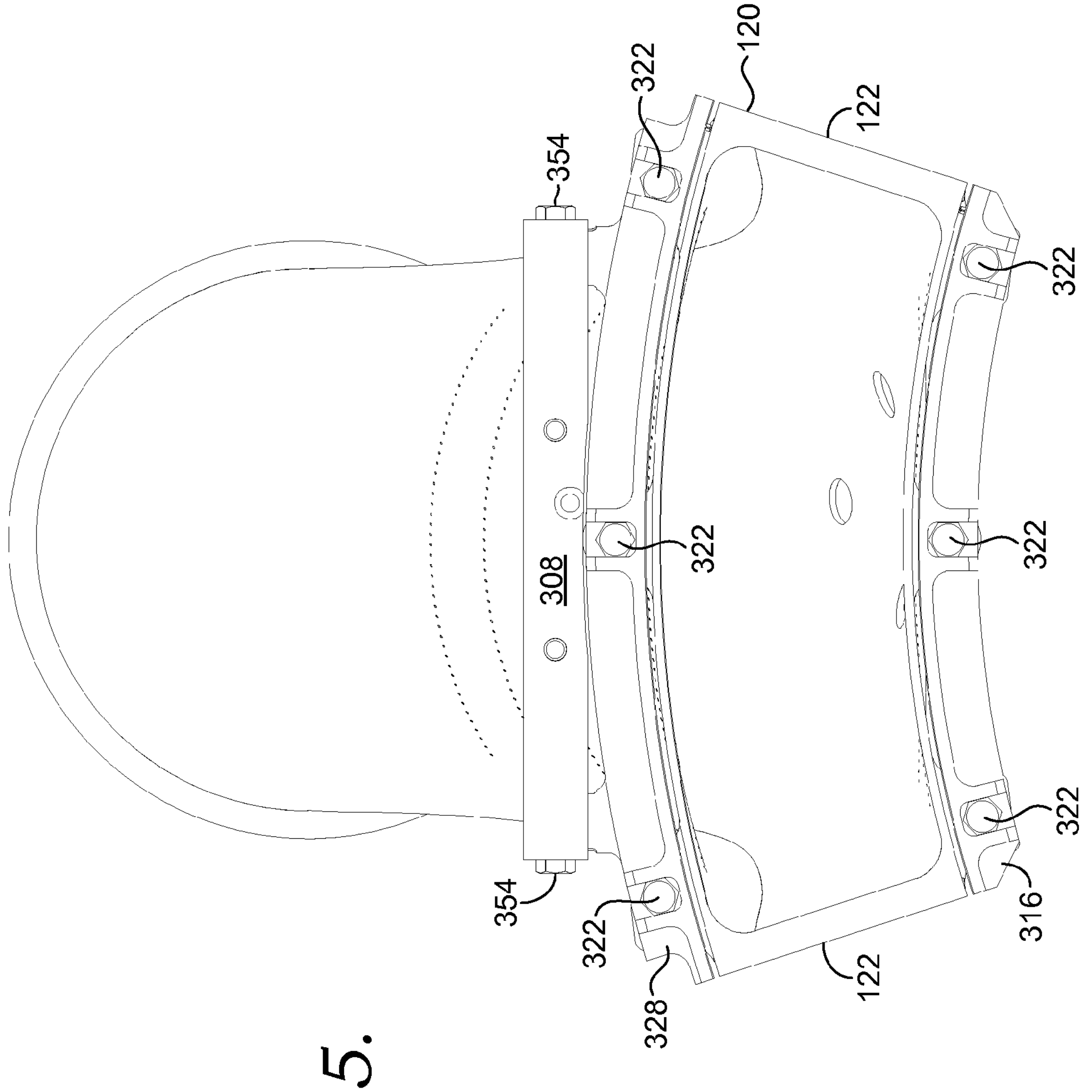
FIG. 5 depicts an elevation view of the transition duct assembly of FIG. 3 looking forward from an outlet of the transition duct assembly in accordance with an embodiment of the present invention.

With continued reference to FIGS. 1-3, and additional reference to FIGS. 4 and 5, embodiments of the present invention provide a mounting system for securing the transition duct assembly 100 to the gas turbine engine 1000 in order to provide an improved range of allowable movements at the transition duct exit end 118 due to thermal gradients as well as a stable mounting of the transition duct assembly 100 overall in order to raise the natural frequency of the duct assembly 100 outside of the turbine 1000 operational natural frequency and engine operational frequencies or order thereof. Accordingly, a forward mounting bracket 200 and an aft frame assembly 300 are provided. The forward mounting bracket 200 includes a central portion 202, or base frame, with a pair of arms 204 extending generally radially from opposing sides of the central portion 202. The central portion 202 and arms 204 have a depth in the axial direction and a thickness in the radial direction sufficient to rigidly and securely mount the forward end (e.g., at the inlet sleeve 102 or otherwise proximal to the inlet end 116) of the duct with a mounting block 1002 or other support structure of the turbine 1000 (e.g., via bolts extending through radial mounting holes 206 in the bracket central portion 202). Depending on manufacturing and assembly tolerances, it may be necessary to adjust the vertical location of the forward mounting bracket 200. If the vertical location needs to be raised up, or outward radially, then one or more shim plates can be placed between the central portion 202 and mounting block 1002.

In the embodiment shown in FIGS. 1, 2 and 4, the inlet sleeve 102 is formed with a circumferentially mounted, radially flanged collar 128 interconnected with a forward side of the mounting bracket arms 204 via threaded mounting bolts or pins 130 received through axial holes in the collar 128 and into threaded axial bores of the mounting bracket arms 204. Note that in order to alter the natural frequency for a swaying mode (60 hz), a plurality of pin/hole couplings (two in this case) are required. In one preferred, though not limiting, arrangement, the forward mounting bracket 200 is sized such that the height H1 of the arms 204 is generally about 2 to 4 times the thickness T1 of the arms 204, and the lateral distance L1 between the axis of the axial bores of the arms 204 is generally about 2 to 5 times the height H1 of the arms 204. The fit between the pins 130 and the axial holes in the collar 128 is designed so as to remain tight during operation and provide torsional rigidity at the forward mounting bracket 200. This relatively tight fit occurs during operation due to changes in operating temperature of the transition duct assembly and helps to increase the natural frequency of the transition duct assembly 100. In one embodiment of the present invention, the pins 130 are fabricated from a cobalt-based alloy such as L-605 and is coated with a Tungsten-Cobalt coating whereas the collar 128 is fabricated with an L-605 sleeve through which the pins 130 pass therethrough.

Figure 8:
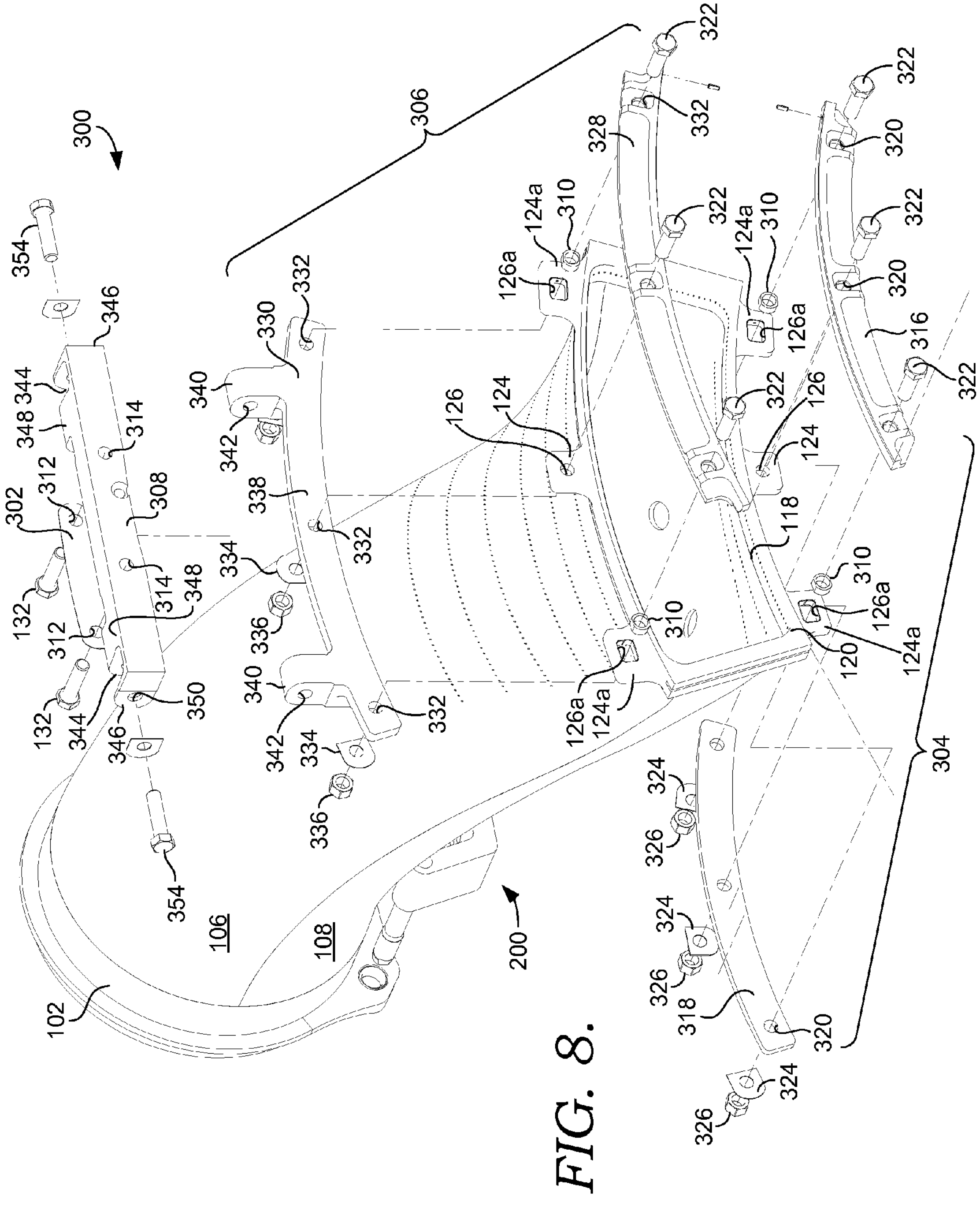
FIG. 8 depicts an exploded assembly view of the transition duct assembly in accordance with an embodiment of the present invention; and, FIG. 9 depicts a perspective view of a portion of the mounting system of a transition duct assembly in accordance with an embodiment of the present invention.

Continuing in reference to FIGS. 1-5, and with additional reference to FIG. 8, the aft frame assembly 300 is generally secured with the aft frame 120 at the panel assembly exit end 118 and preferably with a turbine inlet frame section 1004 (see FIG. 2) by a single pair of bolts 132 or other mounting means. The frame assembly 300 includes, in broad terms, a mounting plate 302, an inner bulkhead assembly 304, an outer bulkhead assembly 306, and an aft mounting brackets 308, as well as various bushings 310 and mounting means (e.g., threaded nut and bolt combinations), as explained in detail below.

The mounting plate 302 preferably has a pair of axial holes 312 there through matching a pair of axial holes 314 formed in the aft mounting bracket 308. Accordingly, in assembly, the pair of bolts 132 are inserted through the mounting plate axial holes 312 and the aft mounting bracket axial holes 314 to secure the mounting plate 302 and the aft mounting bracket 308 together in abutting relation and mount the aft frame assembly 300 to the turbine 1000 (e.g., via the frame section 1004). As explained in detail below, the remaining portions of the aft frame assembly 300 mount the transition duct exit end 118 with the turbine 1000 through a coupling with the aft mounting bracket 308.

The inner bulkhead assembly 304 and the outer bulkhead assembly 306 are fixed to the aft frame 120 through the retention lugs 124 and 124*a*. The inner bulkhead assembly 304 includes a first inner bulkhead 316 and a second inner bulkhead 318 positioned on opposite sides of the aft frame retention lugs 124 and 124*a*. Each of the bulkheads 316 and 318 has a plurality of axial holes 320 there through positioned for alignment with the slots 126 of the aft frame retention lugs 124 and 124*a*. In assembly, a fastener 322, such as a bolt, is inserted through each axial hole 320 of the bulkheads 316, 318 and through the corresponding slots 126 of the aft frame retention lugs 124 from the exit side of the aft frame assembly 300. A washer 324 and a threaded nut 326 capture each fastener 322 on the forward side of the assembly 300. Additionally, bushings 310 are located on the particular fasteners 322 that extend through the slots 126*a* in the laterally outermost retention lugs 124*a*. Each bushing 310 has a second axial length, a second circumferential length, a second radial width, and a through hole for receiving there through the fastener 322. In this configuration, the bushings 310 reside within each slot 126*a* of the outermost retention lugs 124*a* and are preferably pressfit into the slots 126*a*. The bushings 310 are sized such that the first circumferential length of the slots 126*a* is greater than the second circumferential length of each bushing 310, thereby allowing for relative circumferential movement of each of the outermost retention lugs 124*a*, and hence aft frame 120, relative to the bushings received therein. This is due to thermal expansion between the retention lugs 124*a* and respective bulkhead assemblies.

The outer bulkhead assembly 306 has a similar configuration to the inner bulkhead assembly 304, and includes a first outer bulkhead 328 and a second outer bulkhead 330 positioned on opposite sides of the aft frame retention lugs 124 and 124*a*. Each of the bulkheads 328, 330 likewise has a plurality of axial holes 332 there through positioned for alignment with the slots 126, 126*a* of the aft frame retention lugs 124, 124*a*. As with the inner bulkhead assembly 304, assembly is accomplished via placement of fastener 322 through each bulkhead axial hole 332 and through the corresponding slots 126 of the aft frame retention lugs 124 from the exit side of the aft frame assembly 300. A washer 334 and a threaded nut 336 capture each fastener 322 on the forward side of the assembly 300. Additionally, the bushings 310 are used in the same manner in the outer bulkhead assembly 306 as in the inner bulkhead assembly 304.

The interconnection between the outer bulkhead assembly 306 and the aft mounting bracket 308 serves as the coupling point between the aft frame 320 (and thus the transition duct assembly 100) and the turbine frame section 1004. Specifically, the second outer bulkhead 330 is formed with a main body section 338 where the axial holes 332 are disposed, and two or more towers 340 extending radially outward from the main body section 338 generally proximate the circumferential ends of the bulkhead 330. Each tower 340 has a through hole 342 oriented generally perpendicularly to the axial holes 332. The aft mounting bracket 308 is formed with a set of receiving channels 344 sized to receive therein the towers 340 of the bulkhead 330. The channels 344 are each formed between an end flange 346 and a block member 348 of the bracket 308, with both the end flange 346 and block member 348 extending generally in the axial direction. For the embodiment depicted in FIGS. 6-9, the tower 340 has a thickness that is approximately equal to the thickness of the adjacent block member 348. Furthermore, the towers 340 have a radial height that is up to twice its thickness. The size aspects are necessary to raise the transition piece natural frequency to an acceptable level. Each end flange 346 is formed with a through hole 350 and each block member 348 is formed with a threaded counterbore 352 aligned with the through hole 350. The through holes 350 and counterbores 352 are oriented generally perpendicular to the mounting axial holes 314 of the bracket 308, thus being configured for alignment with the through holes 342 of the corresponding towers 340 of the second outer bulkhead 330. In assembly, a fastener 354 is inserted through each end flange through hole 350 and tower through hole 342 to be preferably threadingly received within one of the threaded counterbores 352 of the respective block 348, thereby securing the second outer bulkhead 330 and thus the transition duct aft frame 120 with the aft mounting bracket 308.

Figure 6:
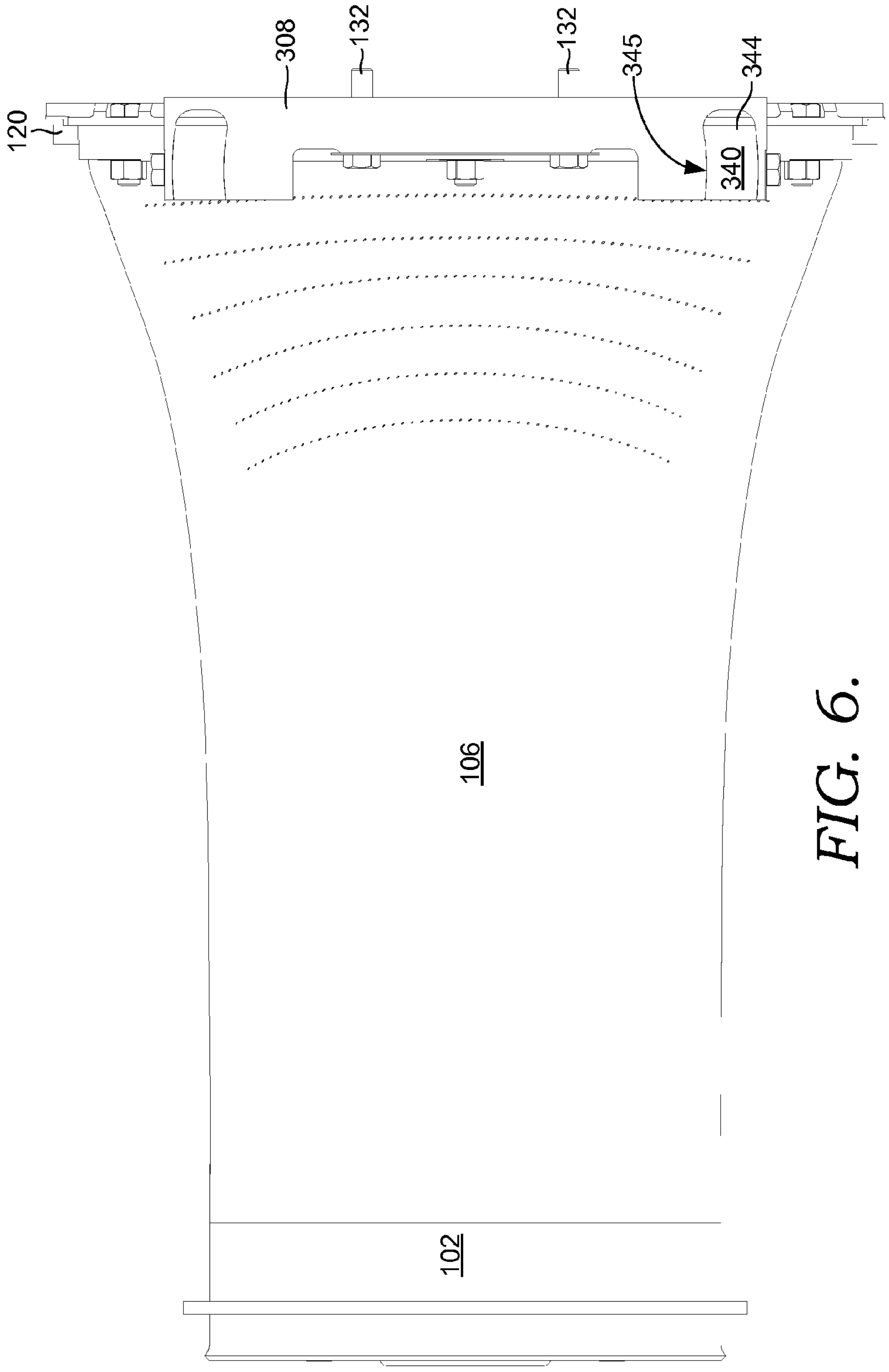
FIG. 6 depicts a top elevation view of the transition duct assembly of FIG. 3 in accordance with an embodiment of the present invention.
Figure 7:
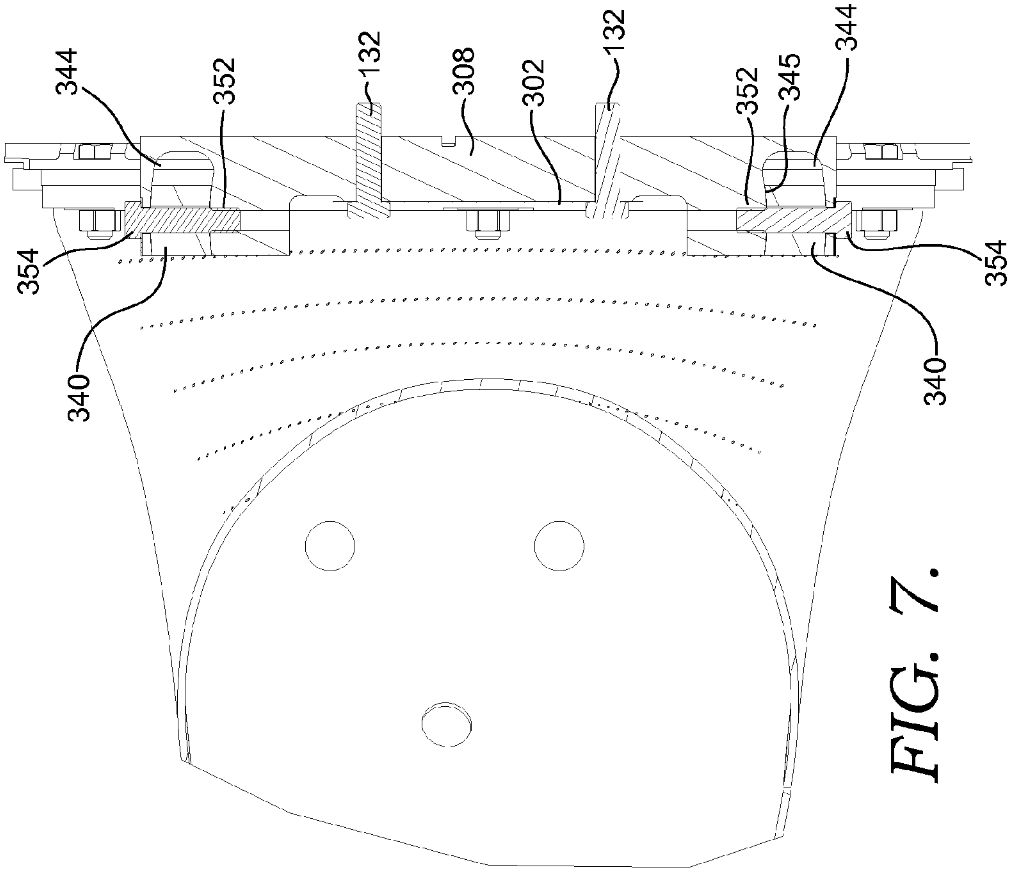
FIG. 7 depicts a cross section view of a mounting system of the transition duct assembly of FIG. 3 in accordance with an embodiment of the present invention.
Figure 9:
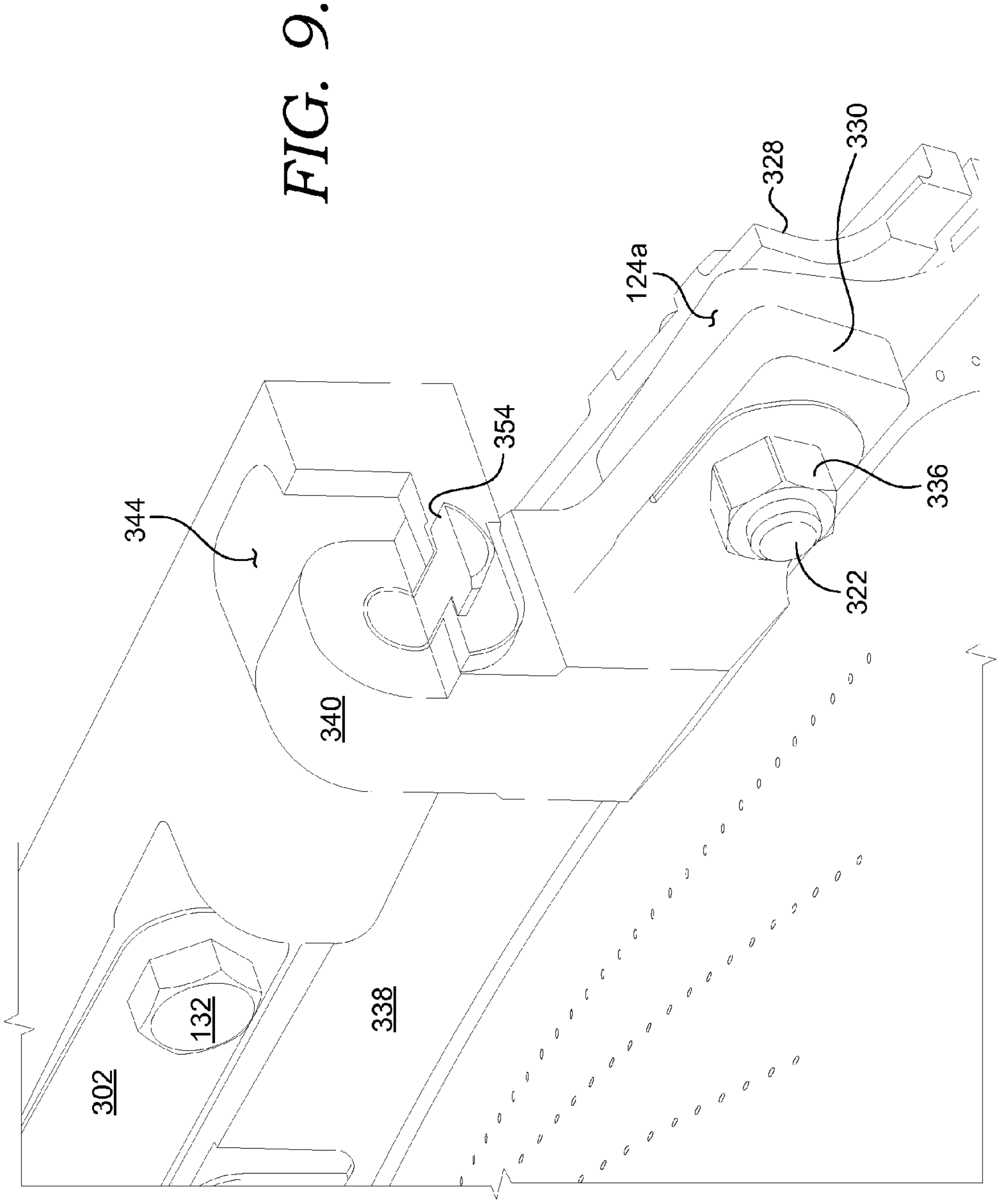

With further reference to FIGS. 6, 7 and 9, in one embodiment of the frame assembly 300, the receiving channels 344 of the aft mounting bracket 308 are formed with curved radii 345, whereby the radius thereof originates about a center aligned with a radial axis of the turbine 1000 itself. This configuration provides a small amount of yaw adjustment, or movement in a transverse direction, for the transition duct aft frame 120 in mounting with the turbine 1000. This can be advantageous if parts are not fabricated to exact tolerances, during assembly of the duct assembly to the turbine, or when thermal growth occurs during turbine operation. In particular, because each fastener 354 is merely slid through the end flange through hole 350 of the aft mounting bracket 308 and tower through hole 342 of the second outer bulkhead 330 (being threadingly received by the counterbore 352 of the aft mounting bracket 308), there is a small amount of "free play" between the interconnection between the aft mounting bracket 308 and the second outer bulkhead 330 (regulated by the diameter of the bolt 354). Due to the pivot location of the transition duct assembly 100 being located proximate the aft frame 120, a small amount of movement (0.060"-0.080") in the transverse direction can result in +/−0.200" of movement near the transition duct assembly inlet end.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

What is claimed is:

1. A transition duct assembly comprising:

a panel assembly;

a generally rectangular aft frame fixed to an exit end of the panel assembly, the aft frame having a plurality of retention lugs located on the aft frame;

an aft mounting bracket coupled to one or more of the retention lugs; and, a forward mounting bracket positioned adjacent an inlet of the panel assembly;

inner and outer bulkhead assemblies having:

a first inner bulkhead and a first outer bulkhead, each of the first bulkheads having a plurality of first through holes;

a second inner bulkhead and a second outer bulkhead, each of the second bulkheads having a plurality of second through holes, the second outer bulkhead also having a plurality of towers extending radially outward from the second outer bulkhead, the towers positioned towards ends of the second outer bulkhead end, each tower having a through hole oriented generally perpendicular to the plurality of second through holes and each tower configured such that it is received in a channel in the aft mounting bracket having a generally U-shaped curved radius;

a plurality of bushings, each bushing having an axial length, a circumferential length, a radial width, and a third through hole; and, a plurality of fasteners for securing the bulkheads and bushings to the retention lugs of the aft frame such that one of the bushings is located within slots of outermost retention lugs and the fasteners for each of the bulkhead assemblies passes through the first and second through holes of the first and second bulkheads and through slots of the retention lugs;

wherein the generally U-shaped curved radius of each channel permits movement of the transition duct assembly in at least a transverse direction about the radial axis.

2. The transition duct assembly of claim 1, wherein the panel assembly comprises a first panel formed from a single sheet of metal, a second panel also formed from a single sheet of metal and joined to the first panel along a plurality of axial seams, thereby forming a duct having an inner wall, an outer wall, and a first thickness there between the inner and outer walls.

3. The transition duct assembly of claim 2, wherein the exit end of the panel assembly has a generally rectangular shape that is defined in-part by a pair of arcs of different diameters concentric about a center and connected by a pair of radial lines extending from the center.

4. The transition duct assembly of claim 3, wherein the generally rectangular aft frame further comprises opposing sidewalls with each of the sidewalls being generally perpendicular to the arcs of the generally rectangular end.

5. The transition duct assembly of claim 3, wherein the plurality of retention lugs are located on the aft frame proximate the arcs of the generally rectangular exit end with outermost retention lugs located proximate ends of the arcs which define the generally rectangular exit end.

6. The transition duct assembly of claim 1, wherein the aft mounting bracket has a plurality of axially oriented mounting holes for securing the mounting bracket to a turbine frame and a plurality of assembly holes located at ends of the mounting bracket and generally perpendicular to the mounting holes.

7. A mounting system for a transition duct capable of altering a natural frequency of the transition duct to a level free from dynamic excitation, the mounting system comprising:

an outer bulkhead assembly having a first outer bulkhead with a plurality of first through holes and a second outer bulkhead, the second outer bulkhead having a plurality of second through holes and a plurality of towers extending radially outward from the second outer bulkhead, the towers each having a radial height that is approximately twice its respective thickness, a through hole oriented generally perpendicular to the plurality of second through holes, the outer bulkhead assembly fixed to an aft frame;

an aft mounting bracket having channels with a generally U-shaped curved radius capable of receiving the towers of the second outer bulkhead, the aft mounting bracket having a plurality of axially oriented mounting holes for securing the bracket to a turbine frame and a plurality of assembly holes located at ends of the mounting bracket and generally perpendicular to the mounting holes;

a first plurality of fasteners positioned through the through holes of the first and second outer bulkheads, a second plurality of fasteners positioned through the assembly holes of the mounting bracket and the through holes of the towers; and, a forward mounting bracket having a central portion and two generally radially extending arms, each of the arms having a single pin for locating within an opening of a collar adjacent to an inlet of the transition duct.

8. The mounting system of claim 7, wherein the first plurality of fasteners also pass through slots in outermost retention lugs of a transition duct aft frame.

9. The mounting system of claim 8, wherein a portion of the outermost retention lugs are positioned axially between the first outer bulkhead and the second outer bulkhead.

10. A transition duct comprising:

a panel assembly having:

a first panel formed from a single sheet of metal; and a second panel formed from a single sheet of metal;

wherein the first panel is fixed to said second panel along a plurality of axial seams, thereby forming a duct having an inner wall, an outer wall, and a first thickness there between the inner and outer walls, a generally cylindrical inlet end, and a generally rectangular exit end, the generally rectangular exit end defined by a pair of arcs of different diameters concentric about a center and connected by a pair of radial lines extending from the center;

a generally rectangular aft frame having opposing sidewalls, the aft frame fixed to the generally rectangular exit end of the panel assembly, each of the sidewalls being generally perpendicular to the arcs of the generally rectangular end;

a plurality of retention lugs located on the aft frame proximate the arcs of the generally rectangular exit end, each of the retention lugs having a second thickness and containing a slot having a first circumferential length and a first radial width; outermost retention lugs located proximate ends of the arcs which define the generally rectangular exit end;

inner and outer bulkhead assemblies including:

a first inner bulkhead and a first outer bulkhead, each having a plurality of first through holes;

a second inner bulkhead and a second outer bulkhead, each having a plurality of second through holes, the second outer bulkhead also having a plurality of towers extending radially outward from the second outer bulkhead, the towers each having a curved surface extending radially outward and a through hole oriented generally perpendicular to the plurality of second through holes;

a plurality of bushings, each bushing having an axial length, a second circumferential length, a second radial width, and a third through hole;

a plurality of fasteners for securing the bulkheads and bushings to the retention lugs of the aft frame such that one of the bushings is located within slots of the outermost retention lugs and the fasteners for each of the bulkhead assemblies passes through the first and second through holes of the first and second bulkheads and through the slot of the retention lugs; and, an aft mounting bracket having generally U-shaped curved channels corresponding to the curved surfaces of the plurality of towers, the aft mounting bracket having a plurality of axially oriented mounting holes for securing the bracket to a turbine frame and a plurality of assembly holes located at ends of the mounting bracket and oriented generally perpendicular to the mounting holes;

wherein the aft frame, the inner and outer bulkhead assemblies, and the mounting bracket are secured in a manner so as to allow for thermal expansion of the aft frame in a circumferential direction via the retention lugs and transverse movement of the transition duct through rotation about the towers.

11. The transition duct of claim 10, wherein the second axial length of the bushing is larger than the second thickness of the retention lug so as to permit movement of the aft frame in a circumferential direction.

12. The transition duct of claim 10, wherein the generally U-shaped curved channels are configured such that movement of the transition duct in the transverse direction is permitted.

13. The transition duct of claim 10, wherein a portion of the outermost retention lugs are positioned axially between the first outer bulkhead and the second outer bulkhead.

14. The transition duct of claim 10, further comprising a forward mounting bracket having a plurality of pins for coupling with a collar proximate an inlet of the transition duct.

15. The transition duct of claim 10, wherein the transition duct is permitted to move up to approximately 0.080 inches in the transverse direction at a region adjacent the aft frame.

* * * * *